Patented Aug. 20, 1929.

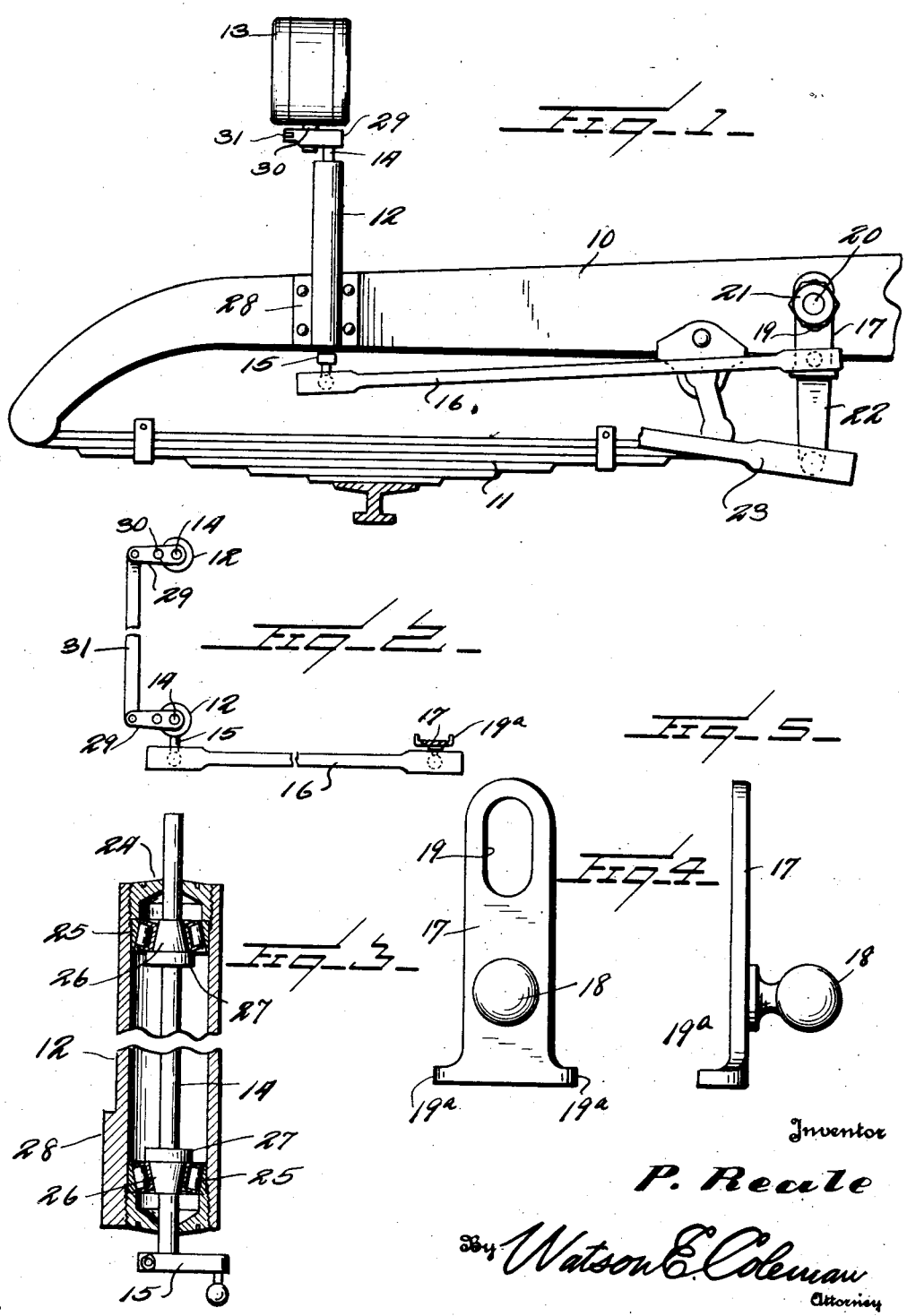

1,725,478

UNITED STATES PATENT OFFICE.

PETER REALE, OF PHILADELPHIA, PENNSYLVANIA.

DIRIGIBLE HEADLIGHT.

Application filed January 10, 1928. Serial No. 245,766.

This invention relates to dirigible headlights, and particularly to that class of dirigible headlights where the headlight is moved by a connecting rod operatively connected to the shaft which steers the vehicle.

The general object of the present invention is to provide a mechanism of this character which is so constructed that it may be applied to any car, which is not connected to the running gear of the automobile, but is entirely mounted upon the chassis and is, therefore, not affected by the relative movements of the running gear and chassis.

A further object is to provide an improved bearing for the headlight shaft which is so constructed that the bearing will prevent the inlet of dust or dirt to the bearing, and which is further so constructed that the bearing cones may be very delicately adjusted.

A still further object is to provide a construction of this character such that the degree of turning movement given to the headlight by the action of the steering wheel may be adjusted.

My invention is illustrated in the accompanying drawing, wherein:—

Figure 1 is a side elevation of a portion of a motor car with my dirigible headlight applied thereto;

Figure 2 is a diagrammatic top plan view;

Figure 3 is a vertical sectional view of the bearing for the headlight spindle;

Figure 4 is a front elevation of the headlight actuating crank arm;

Figure 5 is an edge elevation.

Referring to this drawing, it will be seen that I have illustrated one of the frame bars 10 of an automobile and the spring 11 which is shackled to this frame bar. Mounted upon the frame bar 10 is a cylindrical hollow casing 12 within which the shaft of the headlight 13 is disposed. The shaft 14 of the headlight extends through the casing 12 and at its lower end is provided with a crank arm 15, the extremity of which is formed with a ball adapted to have engagement with a socket formed in the connecting rod 16. This connecting rod extends rearward to a crank arm 17, this crank arm, as shown in Figure 3, being provided with an outwardly projecting globular boss 18 with which the rear end of the connecting rod has engagement.

The arm 17 has a longitudinally extending slot 19 and the transverse shaft 20 extends through this slot. The lower end of the arm has flanges 19$^a$ which fit over around the usual crank arm 22 so as to be rigid therewith when the cross shaft gear nut 21 is put in place. The slot 19 permits the arm to be shifted nearer to or further from the center of motion of the shaft 20 and swung into or out of registry with the crank arm 22. Also mounted upon the shaft is the usual steering arm 22 before referred to which is connected by a connecting rod 23 to the steering wheels in the usual manner. This shaft 20 is operated by any suitable gearing connected to the usual steering wheel.

The casing 12, as shown in Figure 3, is cylindrical in form and interiorly screw-threaded at its ends. The upper and lower ends of the casing are closed by the screw-threaded caps or plugs 24 which bear against and exert thrust upon the outside roller bearing cones 25. These coact with the inside roller bearing cones 26 which surround the spindle or shaft 14, this shaft being formed with the shoulders 27 which bear against these cones 26. By adjusting the caps 24, which caps are very finely screw-threaded, the bearings may be very delicately adjusted so as to secure, for instance, an adjustment of one one-thousandth of an inch. Each of these cylindrical casings 12 has cast thereon the brackets 28 which are bolted to the side beams of the chassis, as shown in Figure 3.

At the upper end of each shaft or spindle 14 there is provided a forwardly projecting bracket 29 which carries the spindle 30 of the headlight 13. Only one of the shafts 14 is provided with the crank 15, as the other shaft is connected to the crank shaft 14 by means of the connecting rod 31 operatively connected to the forward ends of the brackets 29. Thus the movement of one shaft or spindle is transmitted to the other shaft or spindle. Thus both lamps will turn evenly and turn with the movement of the steering gear.

One of the advantages of the construction which I have described resides in the fact that the arm 17 is not connected to the rod 23 which extends to the steering knuckles and is thus not connected to any part of the running gear, but this arm 17 is connected directly to one of the shafts 14. It is reiterated that this shaft 14 thus is not connected to any part of the steering gear which is likely to be oscillated by movements of the running gear. Thus all of the parts of the headlight operating mechanism are mounted upon the chassis and are not placed under the strain of vibration which they would receive was the rod 16, for instance, connected to the rod 23. Further, by adjusting the crank arm 17 nearer to or further from the axis of the shaft 20, a less or greater range of movement can be secured for the headlights and by shifting the crank arm 17 toward or from the spindle 14, the proper adjustment of the dirigible headlights may be secured relative to the turning movement of the car. The bearings which I have provided for the headlight spindles or shafts are very simple and at the same time particularly effective. The roller bearings used are entirely enclosed so that dust and dirt will not pass into the spaces between the rollers and clog or gum the same and thus the bearings will wear for a very long while. Furthermore, either of the bearings may be readily adjusted at any time to take up wear by simply turning the caps 24. This adjustment is very fine and thus the bearings will last for a long while without the necessity of any replacement. The bearings are cheaper than the usual ball bearing, having fewer parts, and the lamp spindles are at all times supported in axial alignment with the axes of the casings 12. Oil or other lubricant may be easily contained within the casing, and particularly in the cup-shaped caps 24, and thus these parts kept lubricated at all times.

I claim:—

1. The combination in a motor car having a transversely extending steering shaft, a steering crank arm mounted thereon and connected to the steering knuckles of the car, of a second crank arm mounted upon said shaft and having a slot through which the shaft passes, the second crank arm having a pair of lugs extending over and embracing the steering crank arm whereby both crank arms are moved together, the slot permitting the second named crank arm to be adjusted longitudinally of the first named crank arm upon said shaft, a dirigible headlight having a vertical spindle, a bearing mounted upon the chassis of the car through which the spindle extends, and an operative connection between said second named crank arm and the spindle to operate the same.

2. In a dirigible headlight, a headlight supporting spindle having at spaced points oppositely tapered bearing cones and shoulders at the inner ends of said cones, a cylindrical casing through which the spindle passes and having a bracket whereby it may be attached to the car, the upper and lower ends of the casing being interiorly screw-threaded, cup-shaped caps extending into the casing at both ends and engaging said screw-threads, inwardly and longitudinally beveled bearing rings disposed within the casing and engaged by the peripheral walls of said caps, and roller bearings mounted between the spindle and said bearing rings and abutted by said shoulders.

In testimony whereof I hereunto affix my signature.

PETER REALE.